(12) United States Patent
Kumar et al.

(10) Patent No.: US 11,713,397 B1
(45) Date of Patent: Aug. 1, 2023

(54) COMPOSITION FOR FORMING CORROSION RESISTANT COMPOSITE COATING

(71) Applicant: King Fahd University of Petroleum and Minerals, Dhahran (SA)

(72) Inventors: Arumugam Madhan Kumar, Dhahran (SA); Mohamed Abdrabou Hussein, Dhahran (SA); Naser Mohammed Al-Aqeeli, Riyadh (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 17/821,194

(22) Filed: Aug. 22, 2022

Related U.S. Application Data

(63) Continuation of application No. 17/713,852, filed on Apr. 5, 2022, now Pat. No. 11,447,645.

(51) Int. Cl.
| | |
|---|---|
| C09D 5/08 | (2006.01) |
| C09D 163/00 | (2006.01) |
| C08K 3/014 | (2018.01) |
| C08K 9/04 | (2006.01) |
| C09D 7/80 | (2018.01) |
| C09D 5/24 | (2006.01) |
| C09D 7/40 | (2018.01) |
| C09D 175/04 | (2006.01) |
| C08K 5/16 | (2006.01) |
| C08K 5/17 | (2006.01) |
| C09D 5/16 | (2006.01) |

(52) U.S. Cl.
CPC ............... *C09D 5/08* (2013.01); *C08K 3/014* (2018.01); *C08K 9/04* (2013.01); *C09D 5/24* (2013.01); *C09D 7/80* (2018.01); *C09D 163/00* (2013.01); *C08K 5/16* (2013.01); *C08K 5/17* (2013.01); *C09D 5/16* (2013.01); *C09D 7/69* (2018.01); *C09D 175/04* (2013.01)

(58) Field of Classification Search
None
See application file for complete search history.

(56) References Cited

U.S. PATENT DOCUMENTS

| | | | |
|---|---|---|---|
| 5,532,025 | A | 7/1996 | Kinlen et al. |
| 9,873,816 | B2 | 1/2018 | Al-Aqeeli |
| 10,920,047 | B2 | 2/2021 | Coe |
| 2016/0333191 | A1 * | 11/2016 | Torigata .................. C09D 7/61 |

FOREIGN PATENT DOCUMENTS

| | | | | |
|---|---|---|---|---|
| CN | 102732155 | B | 11/2013 | |
| CN | 111662603 | A * | 9/2020 | .......... C08F 283/105 |
| CN | 111732379 | A | 10/2020 | |
| CN | 111662603 | B | 10/2021 | |

OTHER PUBLICATIONS

CN111662603 English Machine Translation, prepared Jun. 15, 2022. (Year: 2022).*

Al-Aqeeli, et al. ; Fabrication and Assessment of Crumb-Rubber-Modified Coatings with Anticorrosive Properties ; Materials, 8 ; Jan. 6, 2015.

Wang, et al. ; Polyaniline as marine antifouling and corrosion-prevention agent ; Synthetic Metals 102 ; pp. 1377-1380 ; 1999.

* cited by examiner

*Primary Examiner* — Christopher M Rodd
(74) *Attorney, Agent, or Firm* — Oblon, McClelland, Maier & Neustadt, L.L.P.

(57) ABSTRACT

A saltwater corrosion resistant hybrid composite is provided. The saltwater corrosion resistant hybrid composite coating includes at least one conductive polymer, crumb rubber, and a cured epoxy. The conductive polymer is dispersed in particles of the crumb rubber to form a network. The network is dispersed in the cured epoxy to form the saltwater corrosion resistant hybrid composite coating. A method of making of the saltwater corrosion resistant hybrid composite is also provided. A metal when coated with the resistant hybrid composite of the present disclosure is resistant to salt-water corrosion.

13 Claims, 4 Drawing Sheets

COMPOSITION FOR FORMING CORROSION RESISTANT COMPOSITE COATING

CROSS-REFERENCE TO RELATED APPLICATIONS

The present application is a Continuation of U.S. application Ser. No. 17/713,852, now allowed, having a filing date of Apr. 5, 2022.

BACKGROUND

Technical Field

The present disclosure is directed to a corrosion resistant composite, and particularly to a saltwater corrosion resistant hybrid composite, and a method of preparing the saltwater corrosion resistant hybrid composite.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Significant exposure to salt water can cause corrosion of metal surfaces. Various corrosion inhibitors such as, alkyd-based coatings, oil-based coatings using natural oils, water emulsion-based coatings, urethane-based coatings, chlorinated rubber-based coatings, vinyl-based coatings, epoxy coatings, and zinc-based coatings, have been developed to inhibit corrosion. However, most of the conventionally used corrosion resistant coatings lack effective corrosion resistance when exposed to marine and industrial environmental conditions. Further, high manufacturing cost is a major drawback of such conventional coatings. Hence, there is a need for an efficient, long-lasting and an inexpensive corrosion resistant coating which may substantially reduce or eliminate the above limitations.

SUMMARY

In an exemplary embodiment, a saltwater corrosion resistant hybrid composite coating is described. The saltwater corrosion resistant hybrid composite coating includes at least one conductive polymer, crumb rubber (CR), and a cured epoxy. The conductive polymer is dispersed in particles of the crumb rubber to form a network, wherein at least a portion of the crumb rubber is covalently bound to the conductive polymer. The network is dispersed in the cured epoxy to form the saltwater corrosion resistant hybrid composite coating.

In some embodiments, the network includes 1-10 wt. % of the crumb rubber and 90-99 wt. % of the conductive polymer, based on the total weight of the crumb rubber and the conductive polymer.

In some embodiments, the saltwater corrosion resistant hybrid composite coating includes 1-10 wt. % of the conductive polymer and the crumb rubber and 90-99 wt. % of the cured epoxy based on the total weight of the conductive polymer, the crumb rubber, and the cured epoxy.

Some embodiments include one or more conductive polymers selected from a group including a polyaniline (PANI), a polypyrrole (PPy), a polythiophene (PTh), a polyphenylene sulfide (PPS), a polyacetylene (PA), a polyphenylene vinylene (PPV), a poly(3,4-ethylenedioxythiophene) (PEDOT), a polycarbazole (PCz), a polyindole (PIn), a polyazepine, a polypyrene (PP), a polyazulene (PAz), and a polynaphthalene.

In some embodiments, the crumb rubber particles are heated to a temperature of 200 to 400 degrees Celsius (° C.) before the conductive polymer is added to form the network.

In some embodiments, the crumb rubber particles are pre-treated with one or more antifouling compounds selected from a group including copper oxide, zinc oxide, tributyltin, and dichlorooctylisothiazolinone (DCOIT).

In some embodiments, the crumb rubber particles are pre-treated with one or more selected from a group including bleach, trichloroisocyanuric acid, N-chlorosuccinimide, N-bromosuccinimide, chloramine-T, $Cl_2$, and $Br_2$.

In some embodiments, the cured epoxy is a blend of at least one epoxy resin and at least one hardener. In some embodiments, the epoxy resin is at least one selected from a group including bisphenol A, and bisphenol F. In some embodiments, the hardener is at least one selected from a group including phenols, aromatic amines, aliphatic amines, and thiols. The blend includes 80-95 wt. % epoxy resin and 5-20 wt. % hardener, based on the total weight of the epoxy resin and the hardener.

In some embodiments, the saltwater corrosion resistant hybrid composite coating includes 5-10 wt. % polyurethane, based on the total weight of the polyurethane, crumb rubber, conductive polymer, and cured epoxy.

In some embodiments, the crumb rubber is a crumb rubber powder. The crumb rubber powder particles have an average size of 200 to 600 micrometer ($\mu$m).

In some embodiments, a saltwater corrosion resistant surface is coated with the saltwater corrosion resistant hybrid composite coating. The saltwater corrosion resistant surface is at least partially coated with a layer of the saltwater corrosion resistant hybrid composite coating. The layer has a thickness of 40 to 100 $\mu$m.

In some embodiments, the surface is at least one material selected from a group including iron, steel, copper, aluminum, nickel, zinc, cobalt, lead, chromium, tantalum, titanium, zirconium, silver, and niobium.

In some embodiments, the layer is coated on the surface with an electrospray deposition. The layer at least partially has a mushroom pattern.

In some embodiments, the saltwater corrosion resistant surface includes a corrosion potential of −350 to −320 millivolt (mV) after at least 14 days in a solution of 3-7% salt dissolved in water.

In some embodiments, the saltwater corrosion resistant surface includes an impedance modulus (|Z|) of $1 \times 10^{8-9}$ ohm square centimeter ($\Omega cm^2$).

In another exemplary embodiment, a method of making a saltwater corrosion resistant hybrid composite is described. The method includes mixing a conductive polymer monomer and crumb rubber in an acid to form a suspension. The method further includes adding an oxidizing agent into the suspension and stirring for at least 10 hours at a temperature greater than 25° C. to form a reaction mixture. The method further includes filtering and washing the reaction mixture with the acid and de-ionized water to form a wet powder. Furthermore, the method includes drying the wet powder at a temperature greater than 75° C. for at least 10 hours under vacuum to form a dry powder. The method further includes sonicating the dry powder in an aprotic solvent for at least 30 minutes to form a dispersion. The method further includes mixing the dispersion with a hardener and sonicating for at least 30 minutes to form a uniform dispersion. The method further includes evaporating the aprotic solvent from the uniform dispersion to leave a hardener suspension. The method further includes mixing the hardener suspension with an epoxy resin and degassing at a temperature greater than 25° C. for at least 10 minutes to form a corrosion resistant hybrid composite.

In some embodiments, a method of inhibiting corrosion on a surface in a saltwater environment includes partially coating the surface with at least one layer of the saltwater corrosion resistant hybrid composite coating.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
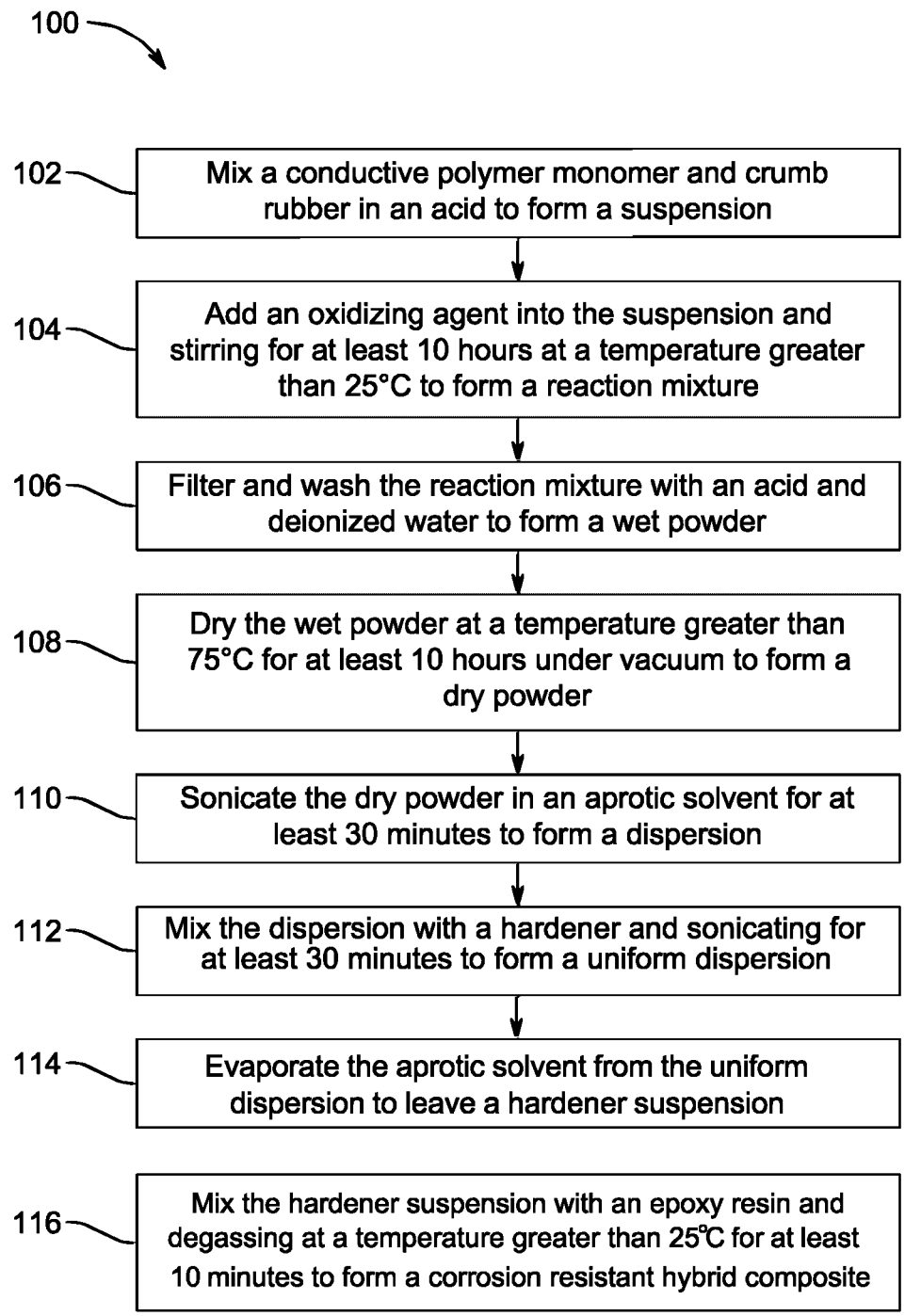
FIG. 1 is a schematic flow diagram of a method of forming a saltwater corrosion resistant hybrid composite, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

Embodiments of the present disclosure are directed to a saltwater corrosion resistant hybrid composite coating, otherwise referred to as the 'coating'. The coating can be applied to surfaces or substrates, such as steel, carbon steel, stainless steel and any other metallic substrate used or known in the art, that are susceptible to corrosion, particularly in marine environments. Experimental results with the coating on the surfaces or substrates demonstrated a significant increase in anti-corrosion behaviors. In addition, the coating exhibits longer service life, enhanced biocompatibilities, and long-lasting antibacterial properties at low cost, thereby circumventing the drawbacks such as high manufacturing cost, and low corrosion resistance properties of the prior art.

The saltwater corrosion resistant hybrid composite coating includes one or more conductive polymers, crumb rubber (CR), and a cured epoxy. In an embodiment, the conductive polymer is dispersed in particles of the CR to form a network, and the network of conductive polymer and CR particles is dispersed in the cured epoxy to form the saltwater corrosion resistant hybrid composite coating. In an embodiment, at least a portion of the crumb rubber particles are covalently bound to the conductive polymer. A conductive polymer, more precisely intrinsically conducting polymer, is a polymer which conducts an electrical current therethrough in one or more valence states of the polymer. Intrinsic electrical properties make the conductive polymer a potential corrosion inhibiting composition. Some embodiments include one or more conductive polymers selected from a group including a polyaniline (PANI), a polypyrrole (PPy), a polythiophene (PTh), a polyphenylene sulfide (PPS), a polyacetylene (PA), a polyphenylene vinylene (PPV), a poly(3,4-ethylenedioxythiophene) (PEDOT), a polycarbazole (PCz), a polyindole (PIn), a polyazepine, a polypyrene (PP), a polyazulene (PAz), and polynaphthalene. In some embodiments, the conductive polymer may be a poly(para-phenylene) (PPP), poly (3-alkyl-thiophenes) such as a poly (3-hexyl thiophene), a poly (3-methyl thiophene) and a poly-(3-octyl thiophene), a polyisothianapthene, a poly-(3-thienylmethylacetate), a polyquinoline, apolyheteroarylenvinylene, in which a heteroarylene group may include, but is not limited to, a thiophene, a furan or a pyrrole, a poly-(3-thienylethylacetate), and derivatives, copolymers and combinations thereof. In an embodiment, the conductive polymer is PANI.

In an embodiment, the CR is obtained from automotive and truck scrap tires. In an embodiment, the crumb rubber particles are 1-6 mm, preferably 2-5, or 3-4 mm in size. In an embodiment, the CR is crumb rubber powder. The crumb rubber powder particles have an average size of 200 to 600 μm, preferably 300-500, or 350-450 μm.

In an embodiment, the network of CR and conductive polymer includes 1-10 wt. % of CR, preferably 3-8, or 4-5 wt. %, and 90-99 wt. % of conductive polymer, preferably 92-97, or 95-96 wt. % based on the total weight of the conductive polymer, and the CR.

In an embodiment, the saltwater corrosion resistant hybrid composite coating includes 1-10 wt. %, preferably 3-8, or 4-5 wt. % of the conductive polymer and the crumb rubber and 90-99 wt. %, preferably 92-97, or 95-96 wt. % of the cured epoxy based on the total weight of the conductive polymer, the CR, and the cured epoxy.

In some embodiments, the cured epoxy is a blend of at least one epoxy resin and at least one hardener. In some embodiments, the blend includes 80-95 wt. % epoxy resin, preferably 83-92, or 85-90 wt. %, and 5-20 wt. % hardener, preferably 8-17, or 10-15 wt. % based on the total weight of the epoxy resin and the hardener. The epoxy resin is at least one selected from a group including bisphenol A, and bisphenol F and the hardener is one or more selected from a group including phenols, aromatic amines, aliphatic amines, and thiols.

In some embodiments, the coating may also include polyurethane, phenolic resins, alkyd resins, aminoplast resins, vinyl alkyds, silicone alkyds, uralkyds, urethane resins, unsaturated polyester resins, silicones, vinyl acetates, vinyl acrylics, acrylic resins, vinyl resins, polyimides, unsaturated olefin resins, fluorinated olefin resins, or a combination thereof. In an embodiment, the coating further includes 5-10 wt. % polyurethane, preferably 6-9, or 7-8 wt. %, based on the total weight of the polyurethane, crumb rubber, cured epoxy, and conductive polymer.

In some embodiments, the CR particles are pre-treated with one or more antifouling compounds selected from a group including the following copper oxide, zinc oxide, tributyltin, and dichlorooctylisothiazolinone (DCOIT). In some embodiments, the CR is soaked in a solution of at least one antifouling compound for at least 1 hour, preferably 1-10 hours, or 2-5 hours, before incorporation into the network of CR and conductive polymer. In some embodiments, the antifouling compound prevents the attachment of organisms such as but not limited to, oysters and barnacles, to the surface described later in the disclosure.

In some embodiments, the CR particles are heated to a temperature of 200 to 400° C., preferably 250-350, or 300° C. before the conductive polymer is added to form the network. The heating of the CR allows for penetration of the conductive polymer into the particles, thereby improving contact surface area.

In some embodiments, the surface of the CR particles is functionalized with at least one halogen before their incorporation into the saltwater corrosion resistant hybrid composite coating. In some embodiments, the halogen may be chloride, bromine, and/or iodine. In an embodiment, the rubber is functionalized with a halogen by submerging the rubber in a solution of a halogenation agent for at least 1 minute. In some embodiments, the halogenation agent is at least one selected from the group consisting of bleach, trichloroisocyanuric acid, N-chlorosuccinimide, N-bromosuccinimide, chloramine-T, $Cl_2$ and $Br_2$. In an embodiment, the halogen substituted crumb rubber is further modified to form a Grignard reagent and reacted with carbon dioxide, a substituted nitrile, a substituted carbonyl, and/or a substituted epoxide, to form a carboxylic acid, a carbonyl, a secondary or tertiary alcohol, and/or a primary alcohol, respectively, under reaction conditions known in the art. In an embodiment, the carboxylic acid functionalized crumb rubber may be further modified with thionyl chloride, and/or an amine to form an acylchloride, and/or an amide, respectively, under reaction conditions known in the art.

In an embodiment, following functionalization of the crumb rubber surface, the functionalized crumb rubber is combined with a monomer of the conductive polymer. In some embodiments, a portion of the monomer reacts with the functionalized crumb rubber surface, resulting in covalent bonding between the crumb rubber and the conductive polymer. In some embodiments, a portion of the monomer polymerizes resulting in a polymer that connects the crumb rubber particles through covalent bonding of the polymer to the surface of the crumb rubber and through the polymer chain to an adjacent crumb rubber particle, creating a network. In an embodiment, the monomer has two or three polymerization sites. In an embodiment, the monomer is p-phenylenediamine. In an embodiment, the conductive polymer is polyaniline, and a crosslinking agent is added to link units of the polyaniline, thereby creating a network of the covalently bound crumb rubber particles and conductive polymer. In some embodiments, the crosslinking agent is glycerol diglycidyl ether.

The cured epoxy acts as a binding agent. Hereinafter, the binding agents refer to materials which convert to adherent membranes on a metal surface and may provide a non-thermoplastic matrix for the conducting polymer blended therein. The binding agent makes the coating capable of being directly applied to a metal surface.

The present disclosure also provides a surface coated with a layer of the saltwater corrosion resistant hybrid composite coating. The surface is one or more materials selected from a group including iron, steel, copper, aluminum, nickel, zinc, cobalt, lead, chromium, tantalum, titanium, zirconium, silver, and niobium. In some embodiments, the surface is partially, 80%, or 90%, or completely coated with a layer of the saltwater corrosion resistant hybrid composite coating.

The corrosion protection may even be provided by components of the coating in the presence of gaps in the coating on the surface. In an embodiment, the coating may be applied over exposed surfaces of metal substrates. In an alternate embodiment, the coating may be applied as an interlayer between a pair of exposed metal surfaces. The layer has a thickness of 10-1000 μm, preferably 40-500 μm, 50-200, or 70-100 μm. In some embodiments, the layer is coated on the surface with electrospray deposition. In some embodiments, the layer is coated on the surface by various methods including, but not limited to, coater, spray coater or painting by using a brush. In an embodiment, the layer partially or completely has a mushroom pattern. In some embodiments, the mushroom pattern is microstructures approximately 1-500 μm in size. In some embodiments, the mushroom pattern prevents the attachment of organisms such as but not limited to, oysters and barnacles, to the surface.

In an embodiment, the surface includes a corrosion potential of −350 to −320 mV, preferably −350 to −330, or −350 to −340 mV after at least 14 days in a solution of 3-7% salt dissolved in water. This corrosion potential is improved over surfaces coated with only cured epoxy, or surfaces with no coating.

In an embodiment, the surface also includes an impedance modulus (|Z|) of $1\times10^{8-9}$ Ω $cm^2$, preferably $1\times10^{8.5}$ Ω cm2, or $1\times10^9$ Ω $cm^2$. The impedance modulus is improved at least 1000 times over surfaces coated only with cured epoxy, or surfaces with no coating.

Referring to FIG. 1, a schematic flow diagram of a method 100 of making a saltwater corrosion resistant hybrid composite is illustrated. The order in which the method 100 is described is not intended to be construed as a limitation, and any number of the described method steps can be combined in any order to implement the method 100. Additionally, individual steps may be removed or skipped from the method 100 without departing from the spirit and scope of the present disclosure.

At step 102, the method 100 includes mixing a conductive polymer monomer and crumb rubber in an acid to form a suspension. In some embodiments, the acid has a concentration of 1 to 5 Molar (M), preferably 1-3 M, or 1-2 M. In some embodiments, the acid can be hydrochloric acid, hydrobromic acid, nitric acid, or sulfuric acid. In an embodiment, the acid is hydrochloric acid. In an embodiment, the HCl has a concentration of 2M.

At step 104, the method 100 includes adding an oxidizing agent into the suspension and stirring for more than 10 hours, preferably 10-20 hours, or 14-16 hours, at a temperature greater than 25° C., preferable 25-50° C. or 30-40° C. to form a reaction mixture. In some embodiments, the oxidizing agent may include, but is not limited to, ceric ammonium nitrate, ceric sulfate, potassium nitrate, peroxymonosulfuric acid, or any combination thereof. In an embodiment, the oxidizing agent is ammonium persulfate (APS).

At step 106, the method 100 includes filtering and washing the reaction mixture with acid and de-ionized water to form a wet powder. In some embodiments, the acid is the same as step 102.

At step 108, the method 100 includes drying the wet powder at a temperature greater than 75° C., preferably 75-100, or 80-90° C. for more than 10 hours, preferably 10-24 hours, or 15-20 hours under vacuum to form a dry powder.

At step 110, the method 100 includes sonicating the dry powder in an aprotic solvent for more than 30 minutes, preferably 30-60 minutes, or 40-50 minutes, to form a dispersion. In some embodiments, the aprotic solvent can be benzene, carbon tetrachloride, carbon disulfide, or any combination thereof. In an embodiment, the aprotic solvent is acetone.

At step 112, the method 100 includes mixing the dispersion with a hardener and sonicating for at least 30 minutes, preferably 30-60 minutes, or 40-50 minutes, to form a uniform dispersion. In an embodiment, the hardener is polyamine.

At step 114, the method 100 includes evaporating the aprotic solvent from the uniform dispersion to leave a hardener suspension. In some embodiments, the evaporating is through heating, or under nitrogen flow.

At step 116, the method 100 includes mixing the hardener suspension with an epoxy resin, followed by de-gassing at a temperature greater than 25° C., preferably 25-40, or 30-35° C. for more than 10 minutes, preferably 10-30 minutes, or 20-25 minutes to form a corrosion resistant hybrid composite.

The present disclosure also provides a method of inhibiting corrosion on a surface in a saltwater environment using saltwater corrosion resistant hybrid composite coating. The method includes partial or complete coating of one or more layers of the saltwater corrosion resistant hybrid composite coating onto the surface.

EXAMPLES

The following examples describe and demonstrate exemplary embodiments of the coating as described herein. The examples are provided solely for the purpose of illustration and are not to be construed as limitations of the present disclosure, as many variations thereof are possible without departing from the spirit and scope of the present disclosure.

Example: Materials Required

Aniline, hydrochloric acid (HCl), ammonium persulfate (APS), polyamine hardener, acetone, NaCl solution, water, crumb rubber powder, and epoxy resin.

Example: Method of Preparation

Figure 2:
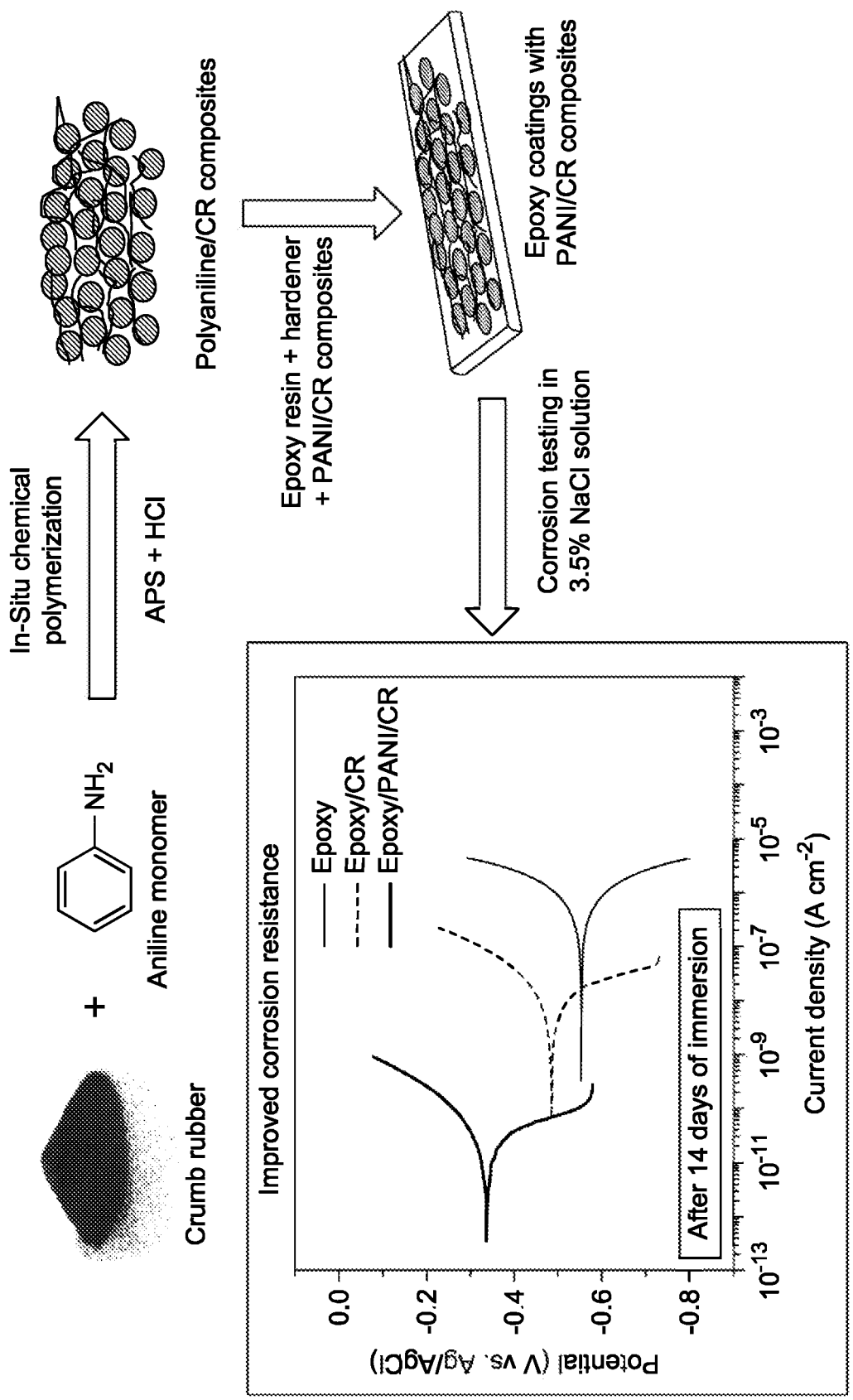
FIG. 2 is an exemplary flow diagram of the method of forming the saltwater corrosion resistant hybrid composite, according to certain embodiments.

Referring to FIG. 2, an exemplary flow diagram of the method 100 of forming the saltwater corrosion resistant hybrid composite is illustrated. 5 milliliter (ml) polyaniline (PANI) was dropped into 70 ml of 2 M of HCl containing various amounts of a CR powder (such as 1%, 5% and 10%) under ultrasonic stirring to make a uniform suspension. After 12 hours (hrs.), 5 grams (g) of APS was dissolved in 20 ml de-ionized water and was dropped into the uniform suspension with constant stirring for about 1 hr. Polymerization was allowed to proceed for 12 h at 30° C. to form a reaction mixture. Further, the reaction mixture was filtered, and washed with 2 M HCl and de-ionized water and was subsequently dried at 90° C. for 12 h in vacuum to obtain a tint blackish green powder.

A cured epoxy including a mixture of epoxy resin and a hardener with a ratio of 3:1, was utilized to prepare epoxy coatings. Various amounts of prepared PANI/CR composites (1, 5 and 10 wt. %) were dispersed in an acetone solvent using ultrasonication for 1 h. Subsequently, a resultant dispersion was ultrasonicated with a polyamine hardener for 30 minutes, to get a uniform dispersion. The acetone solvent was evaporated by heating at 50° C. with stirring. Further, a portion of the epoxy resin was mixed with the prepared dispersion followed by degassing in an oven for 15 minutes to obtain a corrosion resistant hybrid composite. The corrosion resistant hybrid composite was coated on metallic substrates by a drawdown bar coater. Further, wet coated metallic substrates were allowed to dry at room temperature.

The developed coating has an average thickness of 60 μm. The corrosion resistant performance of coated specimen was evaluated in 3.5% NaCl solution using the potentiodynamic polarization and electrochemical impedance spectroscopic (EIS) measurements. Electrochemical corrosion test results confirmed that corrosion protection performance of the epoxy coatings has improved with the addition of PANI/CR composite up to 10 wt. %, in comparison to the performance of epoxy coatings known in the art as well as uncoated substrate.

Figure 3:
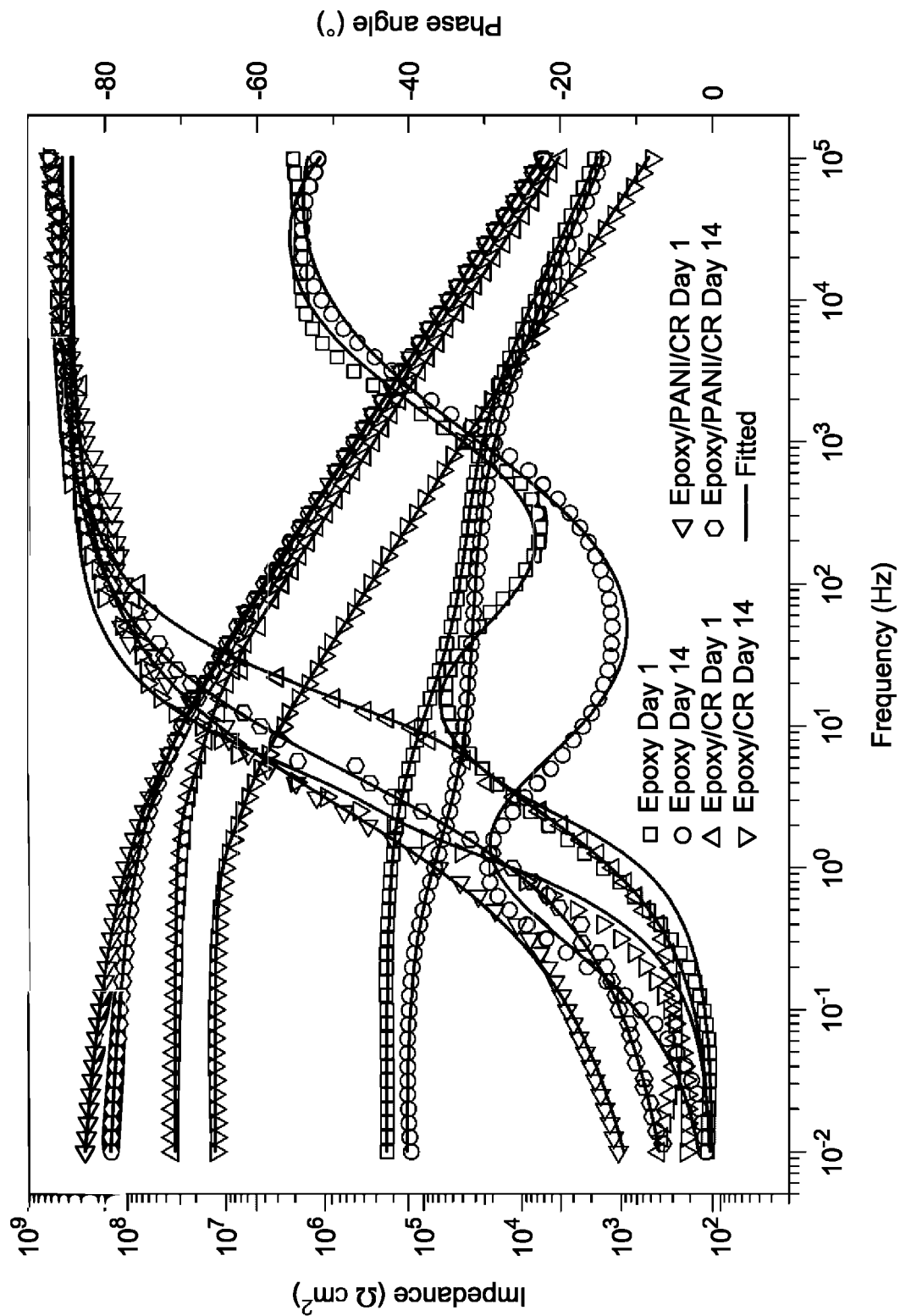
FIG. 3 illustrates graphical representation of bode plots of coated metallic substrates, according to certain embodiments.

Referring to FIG. 3, a graphical representation of bode plots of the coated metallic substrates in 3.5% NaCl solution is illustrated. The coated metallic substrates exhibited a two-time constant behavior in a frequency range of $10^{-2}$ to $10^5$ Hz. A time constant found at a high frequency region is connected to responses of the NaCl solution/coating interface. However, a time constant at a low frequency region is associated to a corrosion phenomenon occurring at the NaCl solution/metallic substrate interface. Generally, a value of an impedance modulus (|Z|) is inversely proportional to corrosion rate. The impedance modulus (|Z|) of the metallic substrates with pure epoxy coatings was found to be around $10^5$ to $10^6$, however, epoxy coatings with PANI/CR composites exhibited Z about $10^9$, which reveals distinctiveness of intact, well adherent composite coatings on the metallic substrates.

Further, Z at 1 Hz replicates the total corrosion protection offered by the epoxy composite coatings, which is observed to increase in the order of pure epoxy, epoxy/CR, epoxy/PANI/CR displaying an improved impedance in comparison with a bare substrate. Moreover, epoxy coatings processed with an addition of 10 wt. % PANI/CR have exhibited higher corrosion protection performance on the metallic substrates in 3.5% NaCl solution.

Figure 4:
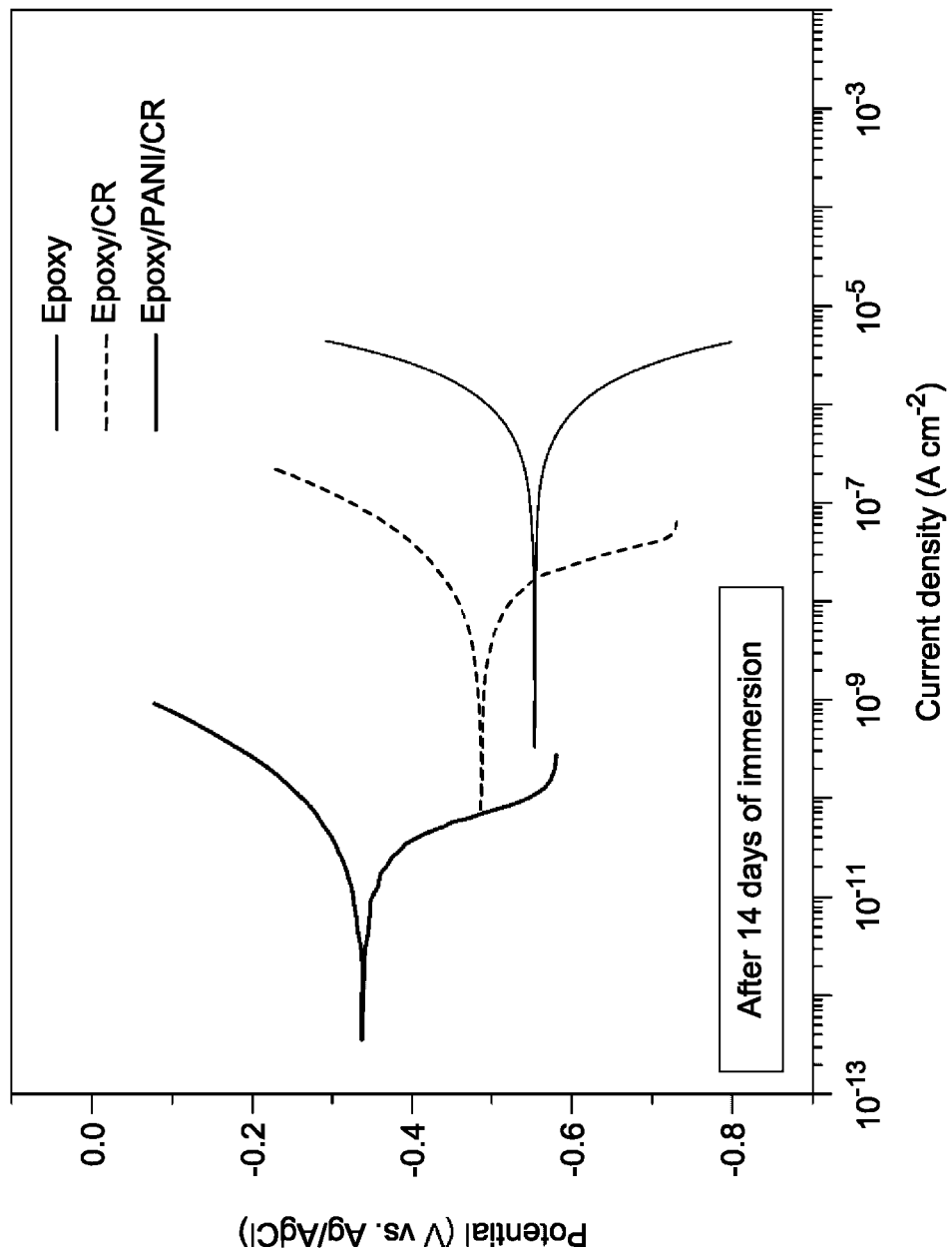
FIG. 4 illustrates graphical representation of partial dependence plot (PDP) curves for the coated metallic substrates, according to certain embodiments.

FIG. 4 refers to a graphical representation of partial dependence plot (PDP) curves for coated metallic substrates after an immersion of 14 days in 3.5% NaCl solution. Anodic sites are attributed to a corrosion process of the coated metallic substrates, while the cathodic sites are accompanied with evolution of hydrogen. A less corrosion current density ($i_{corr}$) and a noble corrosion potential ($E_{corr}$) represented enhancement in a surface protection against corrosion. From the FIG. 4, it can be observed that the current densities of the epoxy coatings with the inclusion of the CR decrease by one order of magnitude, in comparison to pure epoxy substrates. The epoxy/PANI/CR coating was found to have the highest surface protective performance with an $E_{corr}$ of −335 mV and at a lower cathodic current density with respect to other coated metallic substrates, thereby suggesting an increased corrosion protection behavior of epoxy coatings after the addition of PANI/CR.

The coating of the present disclosure finds application in various industries for protecting metallic substrates such as steel structures in marine environments. The coating may also be used in industries and applications including, but is not limited to, automobile, aircraft and shipping industry as a surface coating; bridge and road construction industry as a coating for exposed steel on bridges; construction industry as a coating for structural steel; chemical and industrial manufacturers as a coating for chambers, vessels, metallic machines; the medical industry as a protective coating for metal leads in electrocardiographs; in metallized textile industry and paint manufacturing industries.

Cheap and easy availability of chemicals such as hydrochloric acid, aniline, or pyrrole, or ethylenedioxythiophene (EDOT), APS, epoxy resin results in development of a cost-effective coating. Furthermore, inclusion of the crumb rubber from the automotive and truck scrap tires also enables recycling of the crumb rubber. Presence of epoxy/PANI/CR may enhance the lifetime of a coated structure due to enhanced corrosion protection. The coating of the metal surfaces or substrates with the coating of the present disclosure imparts reduced corrosion rate, enhanced biocompatibilities, and antibacterial performance, and longer service life compared to commercial epoxy coatings. The coating in the present invention is easy to apply and involves a simple fabrication process.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A curable composition for forming a corrosion resistant composite coating, comprising, in the form of a uniform dispersion:
   at least one aprotic solvent;
   at least one conductive polymer;
   crumb rubber; and
   a curable epoxy component;
   wherein the conductive polymer and the crumb rubber are present as a powdered composite material comprising the conductive polymer mixed with particles of the crumb rubber to form a network; and
   wherein at least a portion of the crumb rubber is covalently bound to the conductive polymer in the network.

2. The curable composition of claim 1, wherein the network comprises:
   1-10 wt. % of the crumb rubber; and
   90-99 wt. % of the conductive polymer, based on the total weight of the crumb rubber and the conductive polymer.

3. The curable composition of claim 1, comprising:
   1-10 wt. % of the conductive polymer and the crumb rubber; and
   90-99 wt. % of the curable epoxy component based on the total weight of the conductive polymer, the crumb rubber, and the curable epoxy component.

4. The curable composition of claim 1, wherein:
   the conductive polymer is at least one selected from a group consisting of a polyaniline (PAM), a polypyrrole (PPy), a polythiophene (PTh), a polyphenylene sulfide (PPS), a polyacetylene (PA), a polyphenylene vinylene (PPV), a poly(3,4-ethylenedioxythiophene) (PEDOT), a polycarbazole (PCz), a polyindole (PIn), a polyazepine, a polypyrene (PP), a polyazulene (PAz), and a polynaphthalene.

5. The curable composition of claim 1, wherein:
   the crumb rubber is heated to a temperature of 200 to 400 degree Celsius (° C.) before the conductive polymer is added to form the network.

6. The curable composition of claim 1, wherein:
   the crumb rubber is pretreated with at least one antifouling compound selected from a group consisting of the following copper oxide, zinc oxide, tributyltin, and dichlorooctylisothiazolinone (DCOIT).

7. The curable composition of claim 1, wherein:
   the crumb rubber is pretreated with at least one selected from a group consisting of bleach, trichloroisocyanuric acid, N-chlorosuccinimide, N-bromosuccinimide, chloramine-T, $Cl_2$ and $Br_2$.

8. The curable composition of claim 1, wherein:
   the curable epoxy component comprises 80-95 wt. % of an epoxy resin and 5-20 wt. % of a hardener, based on the total weight of the epoxy resin and the hardener.

9. The curable composition of claim 8, wherein:
   the epoxy resin is bisphenol A.

10. The curable composition of claim 8, wherein:
    the hardener is at least one selected from a group consisting of phenols, aromatic amines, aliphatic amines, and thiols.

11. The curable composition of claim 1, further comprising:
    5-10 wt. % polyurethane, based on the total weight of the polyurethane, the crumb rubber, the curable epoxy component, and the conductive polymer.

12. The curable composition of claim 1, wherein:
    the crumb rubber is a crumb rubber powder;
    wherein the crumb rubber powder particles have an average size of 200 to 600 micrometer (μm).

13. A method of inhibiting corrosion on a surface in a saltwater environment, comprising:
    at least partially coating at least one layer of the curable composition of claim 1 onto the surface.

* * * * *